(12) United States Patent
Walunj et al.

(10) Patent No.: US 11,809,004 B1
(45) Date of Patent: Nov. 7, 2023

(54) SYSTEMS AND METHODS FOR ELECTROMAGNETIC INTERFERENCE ABSORPTIVE BRUSHES

(71) Applicant: Juniper Networks, Inc., Sunnyvale, CA (US)

(72) Inventors: Sameer Walunj, San Jose, CA (US); Philippe C. Sochoux, Redwood City, CA (US); Kaustav Ghosh, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/662,258

(22) Filed: May 6, 2022

(51) Int. Cl.
*H04B 10/00* (2013.01)
*G02B 6/42* (2006.01)
*F21V 8/00* (2006.01)
*F16J 15/3288* (2016.01)

(52) U.S. Cl.
CPC ......... *G02B 6/4277* (2013.01); *G02B 6/0093* (2013.01); *F16J 15/3288* (2013.01)

(58) Field of Classification Search
CPC ... G02B 6/4277; G02B 6/0093; F16J 15/3288
See application file for complete search history.

(56) References Cited

U.S. PATENT DOCUMENTS

| | | | | |
|---|---|---|---|---|
| 3,229,093 A * | 1/1966 | Trautvetter | ............. | F41G 7/004 250/252.1 |
| 5,612,780 A * | 3/1997 | Rickenbach | ......... | G02B 6/4248 385/94 |
| 5,708,745 A * | 1/1998 | Yamaji | ................. | G02B 6/3849 385/139 |
| 6,206,577 B1 * | 3/2001 | Hall, III | ............... | G02B 6/3825 439/138 |
| 6,301,418 B1 * | 10/2001 | Freier | .................... | G02B 6/001 362/558 |
| 6,318,728 B1 * | 11/2001 | Addis | .................. | F16J 15/3288 277/355 |
| 6,504,165 B1 * | 1/2003 | Furutoh | ............... | G02B 6/0088 399/66 |
| 6,685,362 B2 * | 2/2004 | Burkholder | .......... | G02B 6/3849 439/607.34 |
| 6,752,663 B2 * | 6/2004 | Bright | .................. | H05K 9/0058 439/607.25 |
| 6,858,955 B2 * | 2/2005 | Lau | ........................ | H02K 5/225 310/239 |
| 8,393,802 B2 * | 3/2013 | Stanley | ................ | G02B 6/3866 385/74 |
| 9,057,847 B2 * | 6/2015 | Lin | ........................ | G02B 6/387 |
| 9,086,554 B2 * | 7/2015 | Scea | ........................ | G02B 6/3849 |
| 9,128,256 B2 * | 9/2015 | Miller | ................... | G02B 6/3821 |
| 9,523,822 B2 * | 12/2016 | Miller | ................... | G02B 6/3849 |
| 9,620,906 B1 * | 4/2017 | Briant | .................. | H01R 12/722 |
| 9,946,034 B1 * | 4/2018 | Eslick | .................. | G02B 6/3849 |
| 10,194,565 B2 * | 1/2019 | Zhou | .................... | H05K 9/0007 |
| 10,241,288 B2 * | 3/2019 | He | ........................ | G02B 6/3893 |

(Continued)

*Primary Examiner* — Agustin Bello
(74) *Attorney, Agent, or Firm* — Harrity & Harrity, LLP

(57) ABSTRACT

In some implementations, a device may include a first flexible barrier that is configured to prevent dust from passing through a cable slot of a network device. The device may further include a second flexible barrier that is configured to absorb at least a portion of an amount of electromagnetic energy generated by the network device.

20 Claims, 8 Drawing Sheets

(56) References Cited

U.S. PATENT DOCUMENTS

| | | | | |
|---|---|---|---|---|
| 11,168,791 | B1* | 11/2021 | Tschida | F16J 15/3288 |
| 2005/0100307 | A1* | 5/2005 | Desmone | G01T 1/20 |
| | | | | 385/115 |
| 2007/0117458 | A1* | 5/2007 | Winker | G02B 6/4201 |
| | | | | 439/607.01 |
| 2008/0178724 | A1* | 7/2008 | Honma | G02B 6/25 |
| | | | | 83/887 |
| 2009/0272883 | A1* | 11/2009 | Iannone | G02B 6/2852 |
| | | | | 250/227.24 |
| 2012/0025472 | A1* | 2/2012 | Reiter | F16J 15/442 |
| | | | | 277/412 |
| 2012/0082417 | A1* | 4/2012 | Stanley | G02B 6/3866 |
| | | | | 385/77 |
| 2013/0019423 | A1* | 1/2013 | Srutkowski | G02B 6/3807 |
| | | | | 15/207.2 |
| 2013/0136400 | A1* | 5/2013 | Isenhour | G02B 6/4214 |
| | | | | 385/79 |
| 2013/0308907 | A1* | 11/2013 | Lin | G02B 6/387 |
| | | | | 385/59 |
| 2014/0270679 | A1* | 9/2014 | Scea | G02B 6/4292 |
| | | | | 385/139 |
| 2016/0103291 | A1* | 4/2016 | Santos | G02B 6/4497 |
| | | | | 30/91.2 |
| 2016/0259131 | A1* | 9/2016 | Erdman | G02B 6/3849 |
| 2016/0259132 | A1* | 9/2016 | Ling | G02B 6/4284 |
| 2017/0059799 | A1* | 3/2017 | Gupta | G02B 6/00 |
| 2017/0097472 | A1* | 4/2017 | Miller | G02B 6/387 |
| 2018/0352687 | A1* | 12/2018 | Zhou | G02B 6/4477 |
| 2019/0027908 | A1* | 1/2019 | Kawaguchi | H05K 9/0081 |
| 2020/0408994 | A1* | 12/2020 | Stewart | G02B 6/4246 |
| 2022/0247134 | A1* | 8/2022 | Hagi | H01B 7/0045 |

* cited by examiner

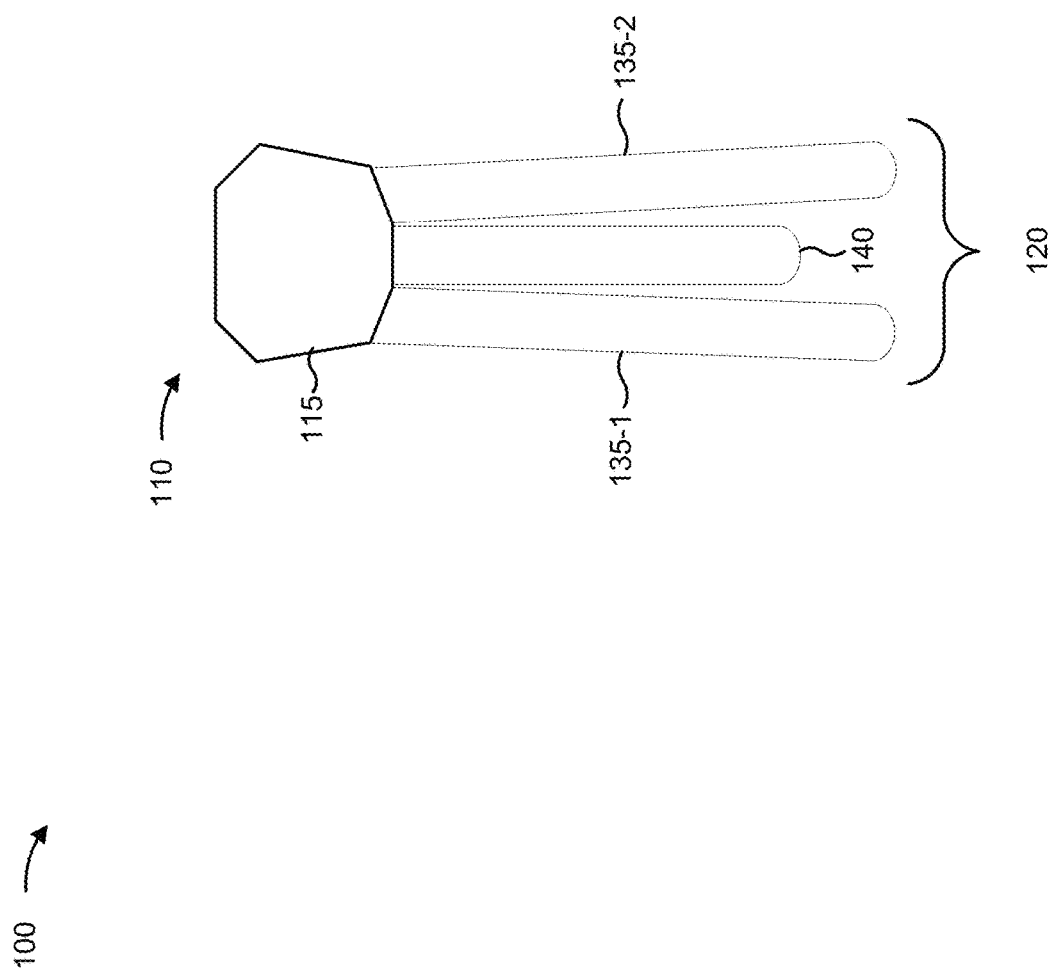

SYSTEMS AND METHODS FOR ELECTROMAGNETIC INTERFERENCE ABSORPTIVE BRUSHES

BACKGROUND

A brush seal assembly may include a series of flexible bristles in the form of a brush. The brush seal assembly may be used to form a protective barrier against dust entering through a cable slot of an electronic device.

SUMMARY

In some implementations, a device includes a first flexible barrier configured to prevent dust from passing through a cable slot of a network device; and a second flexible barrier configured to absorb at least a portion of an amount of electromagnetic energy generated by the network device.

In some implementations, a network device includes a housing forming an interior space, wherein the housing includes an opening configured to allow a cable to pass through the opening and into the interior space; and a brush seal assembly comprising: a first flexible barrier configured to prevent dust from passing through the opening; and a second flexible barrier configured to absorb at least a portion of an amount of electromagnetic energy generated by one or more electrical components of the network device.

In some implementations, a device includes an electrical component and a brush seal assembly. The brush seal assembly may include a plurality of flexible bristles that are configured to create a barrier across at least a portion of a cable slot of the device. The brush seal assembly may include a material that is configured to absorb at least a portion of an electromagnetic energy generated by the electrical component of the device.

BRIEF DESCRIPTION OF THE DRAWINGS

FIGS. 1A-1G are diagrams of an example implementation described herein.

DETAILED DESCRIPTION

Figure 1A:
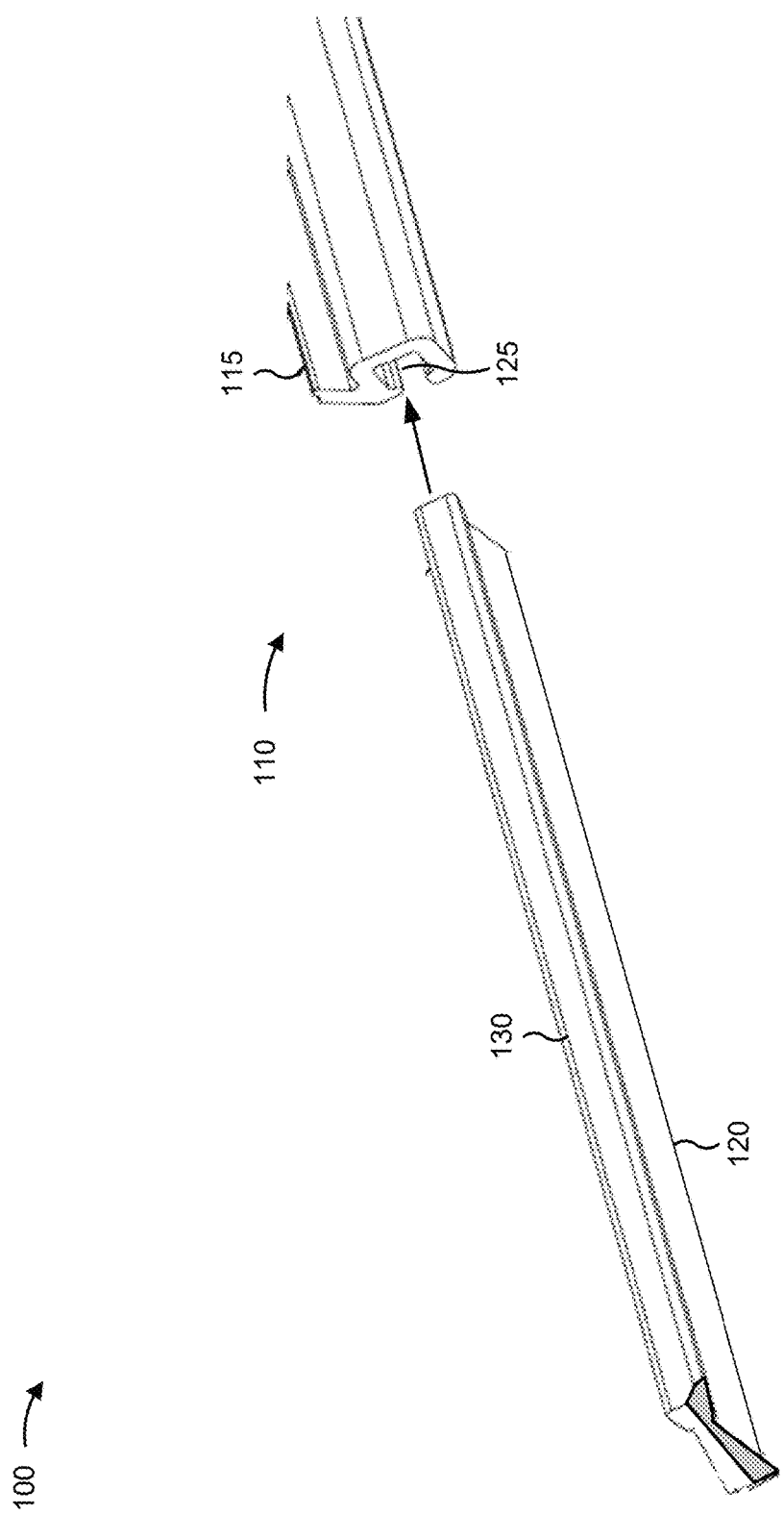

The following detailed description of example implementations refers to the accompanying drawings. The same reference numbers in different drawings may identify the same or similar elements.

A cable slot may comprise an opening formed in a housing of a network device (e.g., a router or a switch). The cable slot may be sized to allow one or more cables to pass through the housing to connect one or more components or modules of the network device to one or more components or modules external to the network device (e.g., one or more components or modules of another network device). For example, a network device may include a cable slot that is configured to enable a fiber optical cable to pass through the housing and connect a quad small form-factor pluggable (QSFP) module of the network device to a QSFP module of another network device.

In some cases, a pair of brush seal assemblies may be used to prevent dust and/or other types of debris from passing through the cable slot. For example, a first brush seal assembly may be coupled to an edge of the housing forming an upper portion of the cable slot. The first brush seal assembly may include a series of flexible bristles that extend downward and at an angle away from the casing. A second brush seal assembly may be coupled to an edge of the housing forming a bottom portion of the cable slot. The second brush seal assembly may include a series of flexible bristles that extend upward and at an angle away from the casing. The ends of the bristles of the two brush seal assemblies may meet around a center of the cable slot. In this way, the brush seal assemblies may form a barrier around a cable extending through the cable slot and may prevent dust and/or other types of debris from passing through the cable slot.

In some cases, the casing of the network device may be configured to prevent electromagnetic (EM) energy generated by the components of the network device from passing through the casing. However, the brush seal assemblies may not absorb EM energy and the cable slots may act as a window that allows the EM energy to freely pass through the casing. The EM energy may cause EM interference (EMI) with other network devices and/or other components of the network device and/or may prevent the network device from complying with various regulatory requirements related to EM energy emissions.

Some implementations described herein related to a brush seal assembly that prevents dust and other types of debris from passing through a cable slot of an electronic device (e.g., a network device or a server device, among other examples) and absorbs at least a portion of the EM energy generated by the electronic device. For example, in some implementations, a brush seal assembly may include a first barrier that is configured to prevent dust and other types of debris from entering through a cable slot of an electronic device. For example, the brush seal assembly may include a plurality of flexible bristles that are configured to form a barrier across at least a portion of a cable slot.

Additionally, the brush seal assembly may include a second barrier that is configured to absorb at least a portion of EM energy generated by one or more components of the electronic device. For example, the brush seal assembly may include an EM energy absorptive material (referred to herein as an absorptive material) that is attached to the first barrier. In some implementations, the absorptive material may be attached to the first barrier based on physically coupling (e.g., spray coating, gluing, or fastening, among other examples) the absorptive material to the first barrier and/or positioning the absorptive material adjacent to the first barrier.

In this way, the brush seal assembly may prevent dust and/or other types of debris from entering into an electronic device through a cable slot and may absorb at least a portion of the EM energy generated by one or more electrical components of the electronic device.

FIGS. 1A-1G are diagrams of an example implementation 100 associated with EMI absorptive brushes. As shown in FIGS. 1A-1G, example implementation 100 includes a brush seal assembly 110 that is configured to prevent dust and/or other types of debris from entering into a network device (or another type of electronic device) through a cable slot and to absorb at least a portion of EM energy generated by one or more electrical components of the network device.

In some implementations, the brush seal assembly 110 may include a base portion 115 and a barrier portion 120. The base portion 115 may be configured to retain the barrier portion 120 within the brush seal assembly 110. In some implementations, the base portion 115 may be configured to couple the brush seal assembly 110 adjacent to a cable slot of a device (described in greater detail below with respect to FIG. 1F).

In some implementations, the base portion 115 may be configured to retain the barrier portion 120 based on receiving a portion of the barrier portion 120. For example, as shown in FIG. 1A, the base portion 115 may be configured to form a channel 125 that is shaped to receive and/or retain an end portion 130 of the barrier portion 120. Additionally, or alternatively, the base portion 115 may include an adhesive and/or a coupling device (e.g., a bracket or a clamp, among other examples) that is configured to retain the barrier portion 120 within the brush seal assembly 110.

Figure 1B:
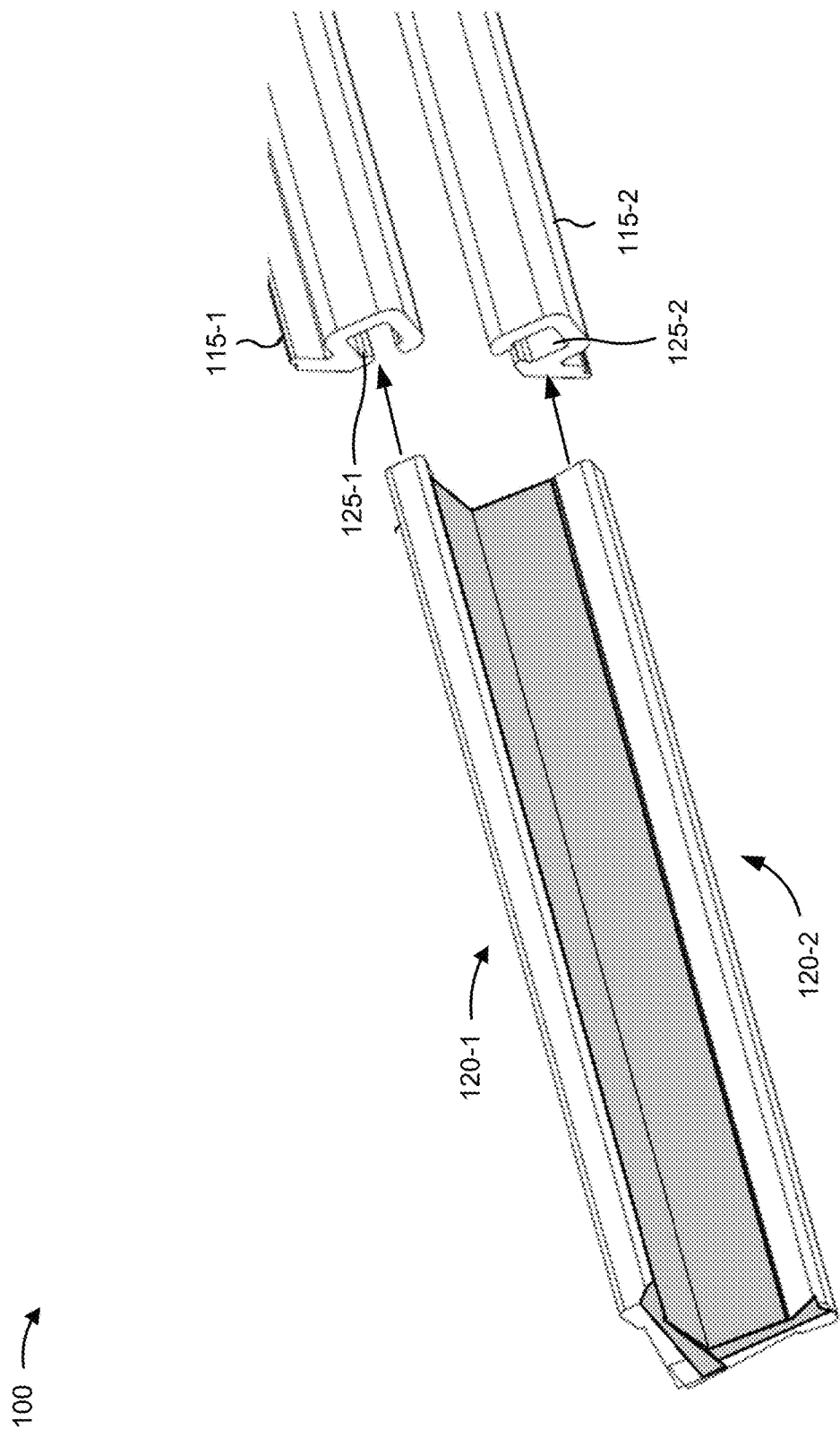

In some implementations, the brush seal assembly 110 may include a plurality of base portions 115 and/or a plurality of barrier portions 120. For example, as shown in FIG. 1B, the brush seal assembly 110 may include a first base portion 115-1 that retains a first barrier portion 120-1 within the brush seal assembly 110 and a second base portion 115-2 that retains a second barrier portion 120-2 within the brush seal assembly 110.

In some implementations, the first base portion 115-1 may be configured to enable the first barrier portion 120-1 to extend across a first portion of a cable slot. Similarly, the second base portion 115-2 may be configured to enable the second barrier portion 120-2 to extend across a second portion of a cable slot. Additionally, or alternatively, the first base portion 115-1 and the first barrier portion 120-1 may comprise a first brush seal assembly 110 and the second base portion 115-2 and the second barrier portion 120-2 may comprise a second brush seal assembly 110 that is different from the first brush seal assembly 110.

Figure 1C:
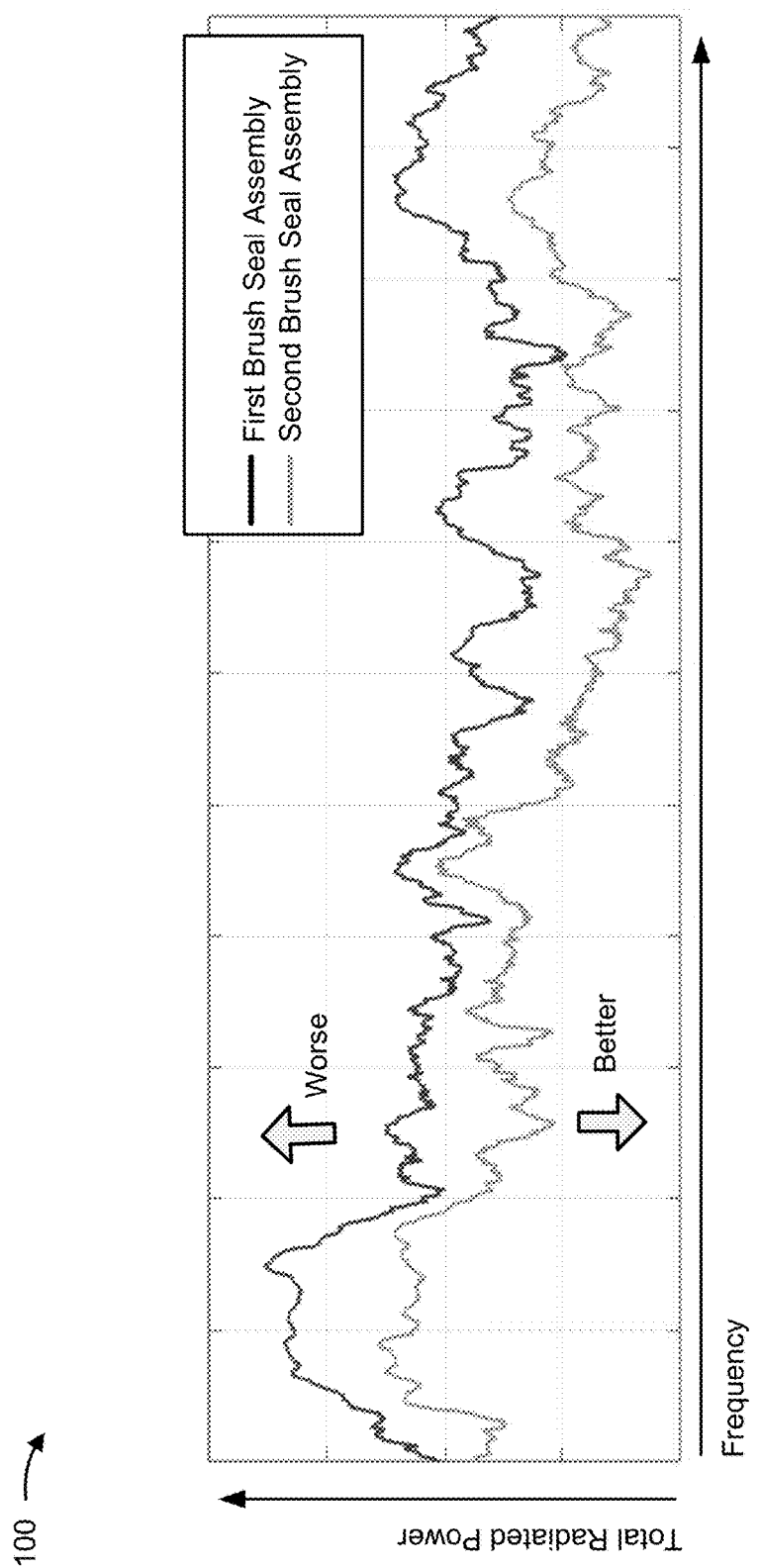
Figure 1D:
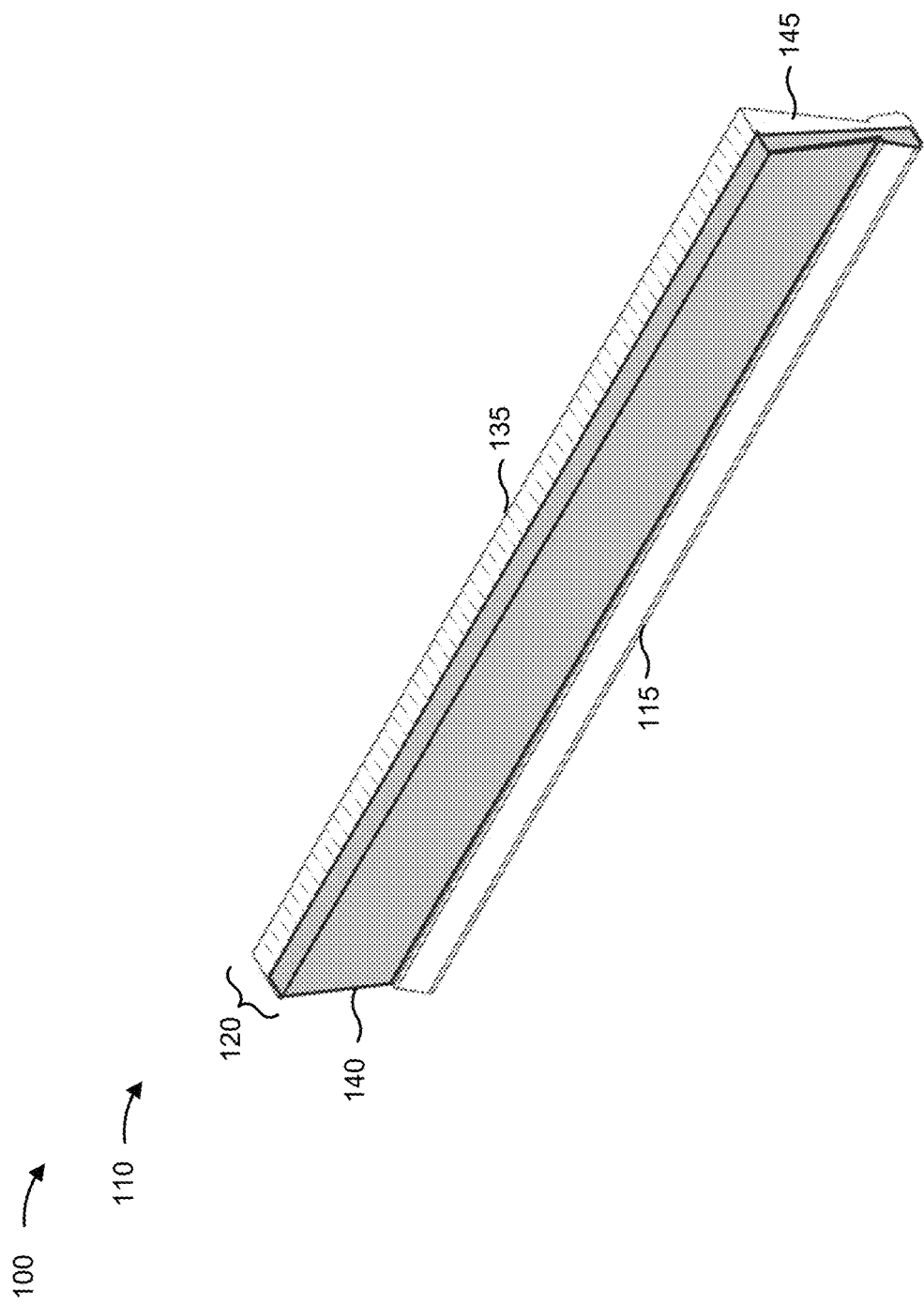

In some implementations, and as shown in FIG. 1D, the barrier portion 120 may include a first barrier portion 135 and a second barrier portion 140. In some implementations, the first barrier portion 135 may be configured to prevent dust and/or other types of debris from passing through a cable slot of a network device. For example, the first barrier portion 135 may include a plurality of flexible bristles 145 that are configured to extend across at least a portion of a cable slot when the brush seal assembly 110 is coupled to a network device.

In some implementations, the second barrier portion 140 may be configured to absorb at least a portion of the EM energy generated by one or more electrical components of a network device. For example, the second barrier portion 140 may include an absorptive material. In some implementations, the absorptive material may be a flexible, high-loss material that is capable of absorbing EM energy generated at a particular range of operating frequencies (e.g., from about 18 GHz to about 40 GHz). For example, the absorptive material may include a base material such as silicon rubber, impregnated with many small particles of material with high permeability and/or many small particles of material with high dielectric loss tangent.

FIG. 1C is an illustration of a graph showing a total radiated power of an electronic device for a first brush seal assembly that does not include the second barrier portion 140 and a second brush seal assembly that includes the second barrier portion 140. As shown in FIG. 1C, the second brush seal assembly may result in a reduction of total radiated power relative to the first brush seal assembly over a range of operating frequencies. As an example, the first brush seal assembly and the second brush seal assembly may each include a plurality of nylon-6 bristles. Additionally, attached to the plurality of nylon-6 bristles, the second brush seal assembly may include a second barrier portion 140. The second barrier portion 140 may comprise a strip of electromagnetically lossy material that is about 2 millimeters thick. When utilized to form a barrier across four cable slots of the electronic device operating at 26 GHz, the second barrier portion 140 may result in the second brush seal assembly achieving about a 7 dB reduction in total radiated power relative to the first brush assembly.

In some implementations, the first barrier portion 135 may be separate from the second barrier portion 140. As shown in FIG. 1D, the first barrier portion 135 may include a plurality of flexible bristles 145 and the second barrier portion 140 may be positioned adjacent to the first barrier portion 135. In some implementations, as shown in FIG. 1D, the base portion 115 may retain the second barrier portion 140 adjacent to a side of the first barrier portion 135.

Additionally, or alternatively, the second barrier portion 140 may be physically attached to the first barrier portion 135. For example, an adhesive and/or a coupling device may be utilized to attach the second barrier portion 140 to a side of the first barrier portion 135.

In some implementations, the barrier portion 120 may include a plurality of second barrier portions 140 and each second barrier portion 140 may be attached and/or adjacent to a group of one or more portions of the first barrier portion 135. For example, the first barrier portion 135 may include a plurality of flexible bristles 145 and each second barrier portion 140 may be attached to a group of one or more bristles of the plurality of flexible bristles 145.

In some implementations, the barrier portion 120 may include a plurality of first barrier portions 135. For example, as shown in FIG. 1E, the barrier portion 120 may include two first barrier portions 135 (e.g., a first barrier portion 135-1 and a first barrier portion 135-2, as shown). The second barrier portion 140 may be positioned adjacent to and/or attached to one or more first barrier portions 135 of the plurality of first barrier portions 135. For example, as shown in FIG. 1E, the base portion 115 may retain the second barrier portion 140 adjacent to the first barrier portion 135-1 and the first barrier portion 135-2 (e.g., the second barrier portion 140 may be positioned in between the first barrier portion 135-1 and the first barrier portion 135-2).

Figure 1F:
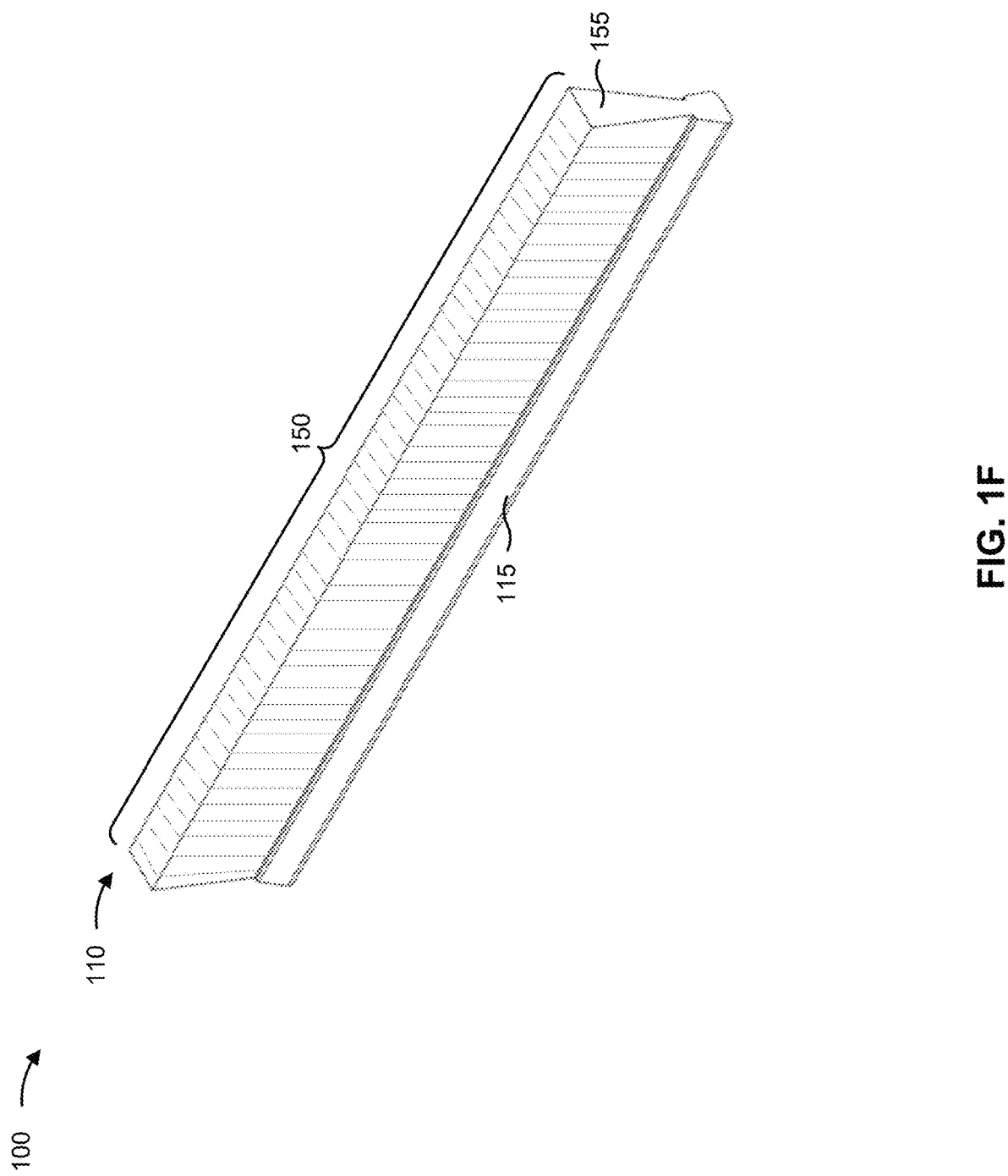

In some implementations, the second barrier portion 140 may be integrated with the first barrier portion 135 to form an integrated barrier portion 150, as shown in FIG. 1F. As further shown in FIG. 1F, the integrated barrier portion 150 may include a plurality of flexible bristles 155 that are configured to prevent dust and/or other types of debris from passing through a cable slot and to absorb at least a portion of the EM energy generated by one or more electrical components of a device to which the integrated barrier portion 150 is attached.

In some implementations, the plurality of flexible bristles 155 may be formed from an absorptive material. For example, the plurality of flexible bristles 155 may be formed from a flexible material that is capable of absorbing EM energy and/or is unable to hold an electric charge (e.g., an EMI absorptive material which has high magnetic and dielectric loss).

In some implementations, the plurality of flexible bristles 155 may be formed by applying the second barrier portion 140 to the first barrier portion 135. For example, the first barrier portion 135 may include a plurality of flexible (e.g., nylon) bristles and the integrated barrier portion 150 may be formed by spray coating an absorptive material (e.g., a laird GDS material) onto the plurality of flexible bristles.

Figure 1G:
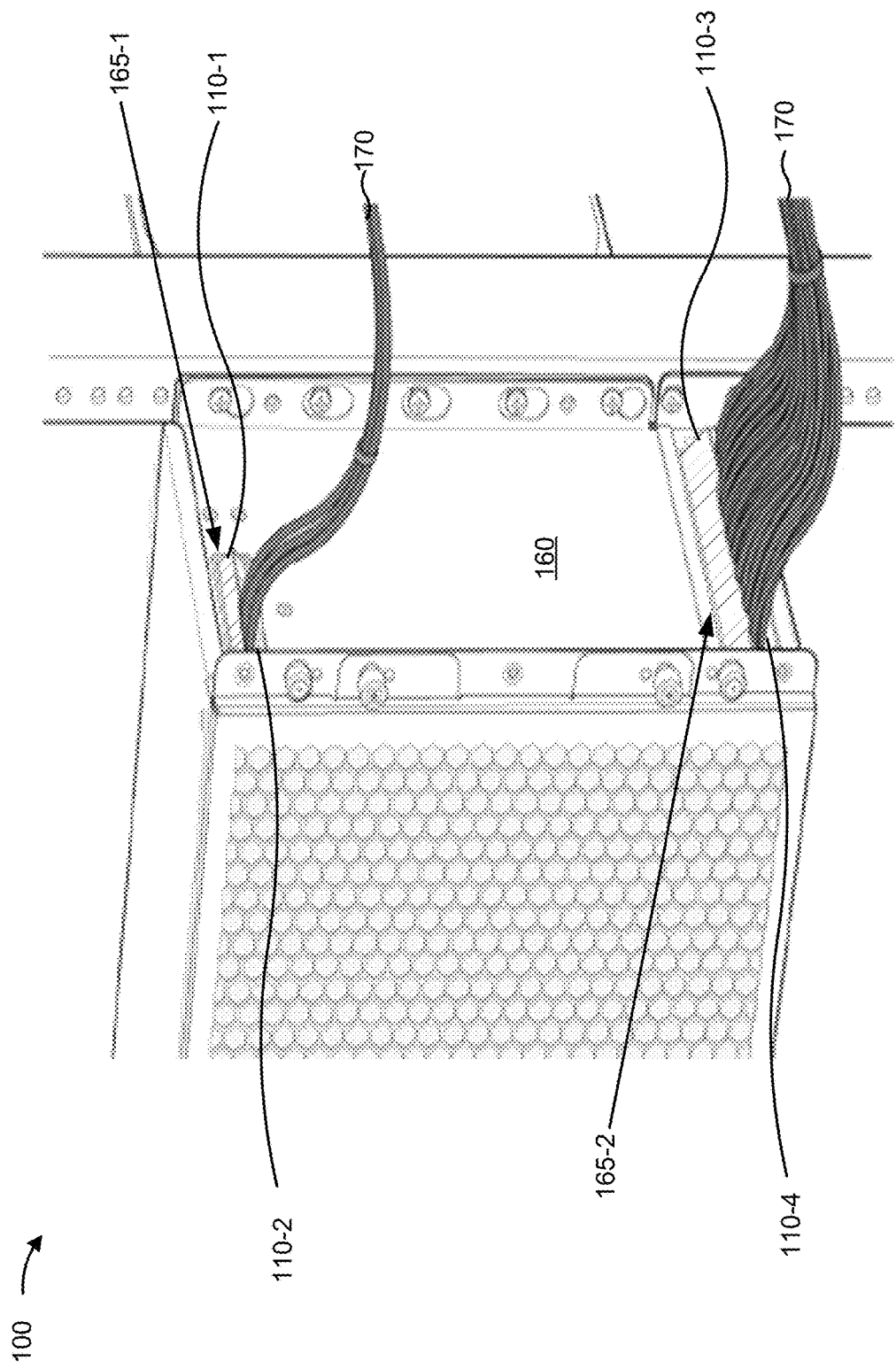

FIG. 1G depicts a network device 160 that includes a plurality of brush seal assemblies 110 (e.g., brush seal assemblies 110-1 through 110-4, as shown) positioned across a plurality of cable slots 165 (e.g., cable slot 165-1 and cable slot 165-2, as shown). Although FIG. 1G depicts a network device 160, a brush seal assembly 110 may be utilized with any electronic device that includes an electrical component that generates EM energy.

As shown in FIG. 1G, a first brush seal assembly 110-1 may be coupled to an edge of a housing of the network device 160 that forms an upper perimeter of a first cable slot 165-1. A base portion 115 of the first brush seal assembly 110-1 may be coupled to the edge of the housing to allow a barrier portion 120 of the first brush seal assembly 110-1 to extend across a first portion (e.g., a top half) of the first cable slot 165-1.

A second brush seal assembly 110-2 may be coupled to an edge of the housing that forms a bottom perimeter of the first cable slot 165-1. A base portion 115 of the second brush seal assembly 110-2 may be coupled to the edge of the housing to allow a barrier portion 120 of the second brush seal assembly 110-2 to extend across a second portion (e.g., a bottom half) of the first cable slot 165-1.

Similarly, a third brush seal assembly 110-3 may be coupled to an edge of a housing of the network device 160 that forms an upper perimeter of a second cable slot 165-2. A base portion 115 of the third brush seal assembly 110-3 may be coupled to the edge of the housing to allow a barrier portion 120 of the third brush seal assembly 110-3 to extend across a first portion (e.g., a top half) of the second cable slot 165-2.

A fourth brush seal assembly 110-4 may be coupled to an edge of the housing that forms a bottom perimeter of the second cable slot 165-2. A base portion 115 of the fourth brush seal assembly 110-4 may be coupled to the edge of the housing to allow a barrier portion 120 of the fourth brush seal assembly 110-4 to extend across a second portion (e.g., a bottom half) of the second cable slot 165-2.

In this way, the first brush seal assembly 110-1 and the second brush seal assembly 110-2 may each absorb a portion of the EM energy generated by the network device 160 and may enable one or more cables 170 to pass through the first cable slot 165-1 while forming a barrier that prevents dust and/or other particles from entering into an interior of the network device 160 via the first cable slot 165-1. Similarly, the third brush seal assembly 110-3 and the fourth brush seal assembly 110-4 may each absorb a portion of the EM energy generated by the network device 160 and may enable one or more cables 170 to pass through the second cable slot 165-2 while forming a barrier that prevents dust and/or other particles from entering into an interior of the network device 160 via the second cable slot 165-2.

As indicated above, FIGS. 1A-1G are provided as examples. Other examples may differ from what is described with regard to FIGS. 1A-1G. The number and arrangement of components shown in FIGS. 1A-1G are provided as examples. In practice, there may be additional components, fewer components, different components, or differently arranged components than those shown in FIGS. 1A-1G. Furthermore, two or more components shown in FIGS. 1A-1G may be implemented within a single component, or a single component shown in FIGS. 1A-1G may be implemented as multiple, distributed components. Additionally, or alternatively, a set of components (e.g., one or more components) shown in FIGS. 1A-1G may perform one or more functions described as being performed by another set of components shown in FIGS. 1A-1G.

Figure 2:
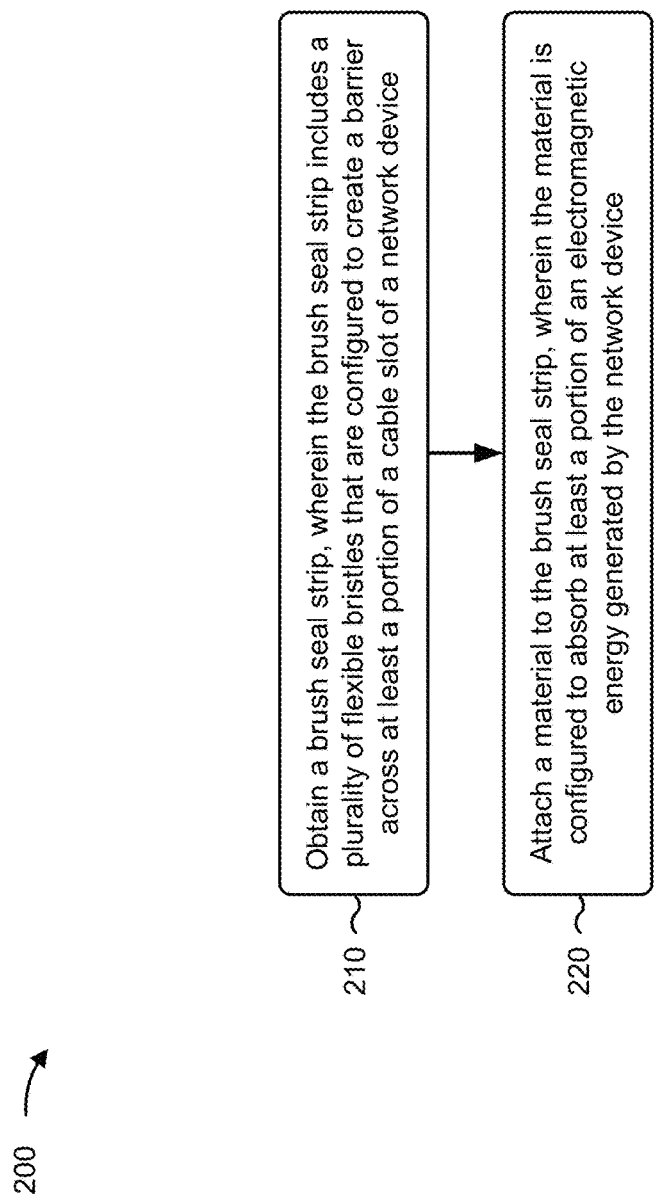
FIG. 2 is a flowchart of an example process relating to electromagnetic interference (EMI) absorptive brushes.

FIG. 2 is a flowchart of an example process 200 associated with systems and methods for electromagnetic interference absorptive brushes. In some implementations, one or more process blocks of FIG. 2 are performed by a device (e.g., a manufacturing device, a robot, and/or the like).

As shown in FIG. 2, process 200 may include obtaining a brush seal assembly, wherein the brush seal assembly includes a plurality of flexible bristles that are configured to create a barrier across at least a portion of a cable slot of a network device (block 210). For example, the device may obtain a brush seal assembly, wherein the brush seal assembly includes a plurality of flexible bristles that are configured to create a barrier across at least a portion of a cable slot of a network device, as described above.

As further shown in FIG. 2, process 200 may include attaching a material to the brush seal assembly, wherein the material is configured to absorb at least a portion of an electromagnetic energy generated by the network device (block 220). For example, the device may attach a material to the brush seal assembly, wherein the material is configured to absorb at least a portion of an electromagnetic energy generated by the network device, as described above.

Process 200 may include additional implementations, such as any single implementation or any combination of implementations described below and/or in connection with one or more other processes described elsewhere herein.

In a first implementation, attaching the material to the brush seal assembly comprises spraying the material onto the plurality of flexible bristles.

In a second implementation, alone or in combination with the first implementation, the material comprises a flexible strip, and wherein attaching the material to the brush seal assembly comprises inserting the flexible strip into a base of the brush seal assembly, wherein the base is configured to receive the flexible strip and to retain the flexible strip adjacent to the plurality of flexible bristles.

In a third implementation, alone or in combination with one or more of the first and second implementations, the plurality of flexible bristles comprises a first plurality of flexible bristles, and wherein the method further comprises inserting a second plurality of flexible bristles into the base of the brush seal assembly.

In a fourth implementation, alone or in combination with one or more of the first through third implementations, the first plurality of flexible bristles is adjacent to a first side of the flexible strip and the second plurality of flexible bristles is adjacent to a second side of the flexible strip.

In a fifth implementation, alone or in combination with one or more of the first through fourth implementations, process 200 includes coupling the brush seal assembly to the network device to enable the plurality of flexible bristles and the material attached to the plurality of flexible bristles to create the barrier across at least the portion of the cable slot of the network device.

Although FIG. 2 shows example blocks of process 200, in some implementations, process 200 includes additional blocks, fewer blocks, different blocks, or differently arranged blocks than those depicted in FIG. 2. Additionally, or alternatively, two or more of the blocks of process 200 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
a first flexible barrier including a plurality of bristles that are configured to prevent dust from passing through a cable slot of a network device,
wherein the plurality of bristles are formed of a first material;
a second flexible barrier including a second material, different than the first material, that is configured to absorb at least a portion of an amount of electromagnetic energy generated by the network device; and
a base portion including a channel that is configured to receive a portion of the first flexible barrier and a portion of the second flexible barrier to couple the first flexible barrier and the second flexible barrier adjacent to the cable slot.

2. The device of claim 1, wherein the second flexible barrier is physically attached to a side of the first flexible barrier.

3. The device of claim 1, wherein the second flexible barrier is a coating that is sprayed onto the plurality of bristles.

4. The device of claim 1, wherein the first flexible barrier is integrated with the second flexible barrier to form an integrated barrier.

5. The device of claim 1, further comprising:
a third flexible barrier configured to prevent dust from passing through the cable slot.

6. The device of claim 5, wherein the channel is further configured to receive a portion of the third flexible barrier.

7. A network device, comprising:
a housing forming an interior space, wherein the housing includes an opening configured to allow a cable to pass through the opening and into the interior space; and
a brush seal assembly comprising:
a first flexible barrier including a plurality of bristles that are configured to prevent dust from passing through the opening,
wherein the first flexible barrier is formed of a first material;
a second flexible barrier including a second material, different than the first material, that is configured to absorb at least a portion of an amount of electromagnetic energy generated by one or more electrical components of the network device, and
a base portion including a channel that is configured to receive a portion of the first flexible barrier and a portion of the second flexible barrier to couple the first flexible barrier and the second flexible barrier adjacent to the opening.

8. The network device of claim 7, wherein the second flexible barrier is physically attached to a side of the first flexible barrier.

9. The network device of claim 7, wherein the second flexible barrier is a coating that is sprayed onto the plurality of bristles.

10. The network device of claim 7, wherein the first flexible barrier is integrated with the second flexible barrier to form an integrated barrier.

11. A device, comprising:
an electrical component; and
a brush seal assembly including:
a plurality of flexible bristles, formed of a first material, that are configured to create a barrier across at least a portion of a cable slot of the device,
a second material that is different than the first material and is configured to absorb at least a portion of an amount of electromagnetic energy generated by the electrical component of the device, and
a base including a channel that is configured to receive a portion of the plurality of flexible bristles and a portion the second material to retain the plurality of flexible bristles and the second material adjacent to the cable slot.

12. The device of claim 11, wherein the second material is a coating that is sprayed onto the plurality of flexible bristles.

13. The device of claim 11,
wherein the second material comprises a flexible strip, and
wherein the base is configured to retain the flexible strip adjacent to the plurality of flexible bristles.

14. The device of claim 13, wherein the plurality of flexible bristles comprises a first plurality of flexible bristles, and wherein the brush seal assembly further comprises:
a second plurality of flexible bristles coupled to the base of the brush seal assembly.

15. The device of claim 14, wherein the first plurality of flexible bristles is adjacent to a first side of the flexible strip and the second plurality of flexible bristles is adjacent to a second side of the flexible strip.

16. The device of claim 11, wherein the base enables the brush seal assembly to extend across a first portion of the cable slot to form the barrier; and
   wherein the device further comprises:
      another brush seal assembly that includes:
         another plurality of flexible bristles, and
         another base that is configured to retain the other plurality of flexible bristles adjacent to the cable slot,
         wherein the other base enables the other brush seal assembly to extend across a second portion of the cable slot to form a second barrier.

17. The device of claim 1, wherein the first material is nylon, and the second material is silicon rubber impregnated with permeable particles.

18. The device of claim 1, wherein the second material is capable of absorbing electromagnetic energy generated at a range of operating frequencies from approximately 18 gigahertz to approximately 40 gigahertz.

19. The network device of claim 7, wherein the first material is nylon-6.

20. The network device of claim 7, wherein the second material is capable of absorbing electromagnetic energy generated at a range of operating frequencies of approximately 18 gigahertz to approximately 40 gigahertz.

\* \* \* \* \*